Patented June 30, 1925.

1,544,533

UNITED STATES PATENT OFFICE.

CARLETON ELLIS, OF MONTCLAIR, NEW JERSEY, ASSIGNOR TO CHADELOID CHEMICAL COMPANY, A CORPORATION OF WEST VIRGINIA.

PROCESS OF TREATING RUBBER.

No Drawing.    Application filed March 22, 1924. Serial No. 701,025.

*To all whom it may concern:*

Be it known that I, CARLETON ELLIS, a citizen of the United States, and a resident of Montclair, in the county of Essex and State of New Jersey, have invented certain new and useful Improvements in Processes of Treating Rubber, of which the following is a specification.

This application is a continuation in part of co-pending application, Serial No. 569,138, filed June 17, 1922. The invention relates to the treatment of rubber or rubber-like substances with a chlorine containing gas, preferably in the presence of hydrochloric acid, and preferably under pressure.

The production of chlorinated rubber heretofore has been substantially along the general direction of dissolving rubber in a solvent, and treating with chlorine gas. In a process of this sort, hydrogen chloride is always evolved, and may escape to the atmosphere or it may in part combine with molecules of rubber not yet saturated with chlorine. Owing to the very restricted solubility of rubber, it is necessary to use a great bulk of solvent and to evaporate this and recover the chlorinated rubber involves considerable expense.

In the present invention it is an object to eliminate the use of a solvent or to reduce the amount of solvent to such a minor quantity that it is inconsequential. Preferably the rubber is treated in the solid form as for example in the form of thin sheets. Thus crêpe rubber may be exposed to the action of the gaseous reagent.

The rubber may, if desired, be masticated before exposure to the chlorine, or it may be masticated during the exposure. The temperature of the treatment may range considerably depending on the character of the product desired. When a comparatively tough product is desired, treatment in the cold is preferable. Treatment at elevated temperatures, say 70° to 75° C. accelerates the reaction, and yields a more brittle product, which however, has a greater solubility. The use of catalytic material is not excluded and these may be incorporated with the rubber. Actinic light also has an activating effect, and may be employed.

The grades of rubber utilized may range from raw or unvulcanized rubber in various forms, including crêpe rubber and sheets, Pontianak rubber or similar rubbers containing resins, or the deresinated rubbers, also various synthetic rubbers. Vulcanized rubber as found is not ordinarily recommended for the operation, but by first removing any free vulcanizing agent, and masticating strongly to more or less break up the vulcanized structure and produce a more plastic material, the product may be exposed to the action of chlorine, preferably under pressure, and the present invention also contemplates the treatment of old rubber or reclaimed rubber, inner tubes and the like, preferably involving powerful mastication and exposure of the masticated rubber to chlorine under pressure.

Also various other substances, more or less allied to rubber, such as chicle, gutta percha, balata, etc., may be employed in carrying out the process, either by themselves or in admixture with rubber.

Hydrogen chloride or other hydrogen halide may be admixed with the chlorine and under the pressure preferably employed reactions may take place resulting in addition of hydrogen halide as well as addition and substitution of chlorine. The reactions between rubber and chlorine under pressure (particularly the addition) results in the formation of hydrogen chloride. It is an object to utilize hydrogen chloride formed, for example, in this way, and cause it to unite, at least in part, with the rubber. It is further an object to separate unreacted chlorine from the unreacted hydrogen chloride, since in the final disposition of the waste gases, hydrogen chloride is more readily absorbed than chlorine by water or aqueous solutions, etc., thus preventing atmospheric pollution.

In carrying out this invention, the chlorination of one batch of rubber may be started with chlorine under pressure. As the reaction proceeds, substitution as well as addition takes place, resulting in the formation of hydrogen chloride. A part of this may unite with double bonds of rubber molecules, which have not yet been saturated with chlorine, and a part may remain uncombined. Eventually the amount of chlorine remaining becomes small enough so that it will not combine further or readily with the partly chlorinated rubber. The amount of hydrogen chloride present at this stage is proportionately great. This mixture of gases may then be passed, still under pressure, into a second chlorinator, containing fresh rubber, the chlorine in the gaseous mixture uniting more readily with this than with the partly chlorinated rubber. Likewise since the concentration of hydrogen chloride is greater, and the degree of saturation less than in the first chlorinator, this substance may add to a greater extent. The proportion of free chlorine is thus reduced.

In some cases it may be desirable to pass the gases into a third chlorinator, or even more, so that the rubber is finally exposed, first, to nearly pure hydrogen chloride under pressure, with the added advantage that free chlorine is practically removed from the gas finally discharged from the system. After the rubber has combined with all the chlorine possible in each stage, it may then be exposed to a gas richer in chlorine, and finally in order to obtain the highest degree of chlorination, to commercially pure chlorine. Thus what may be termed a "multiple effect" chlorination is secured.

The pressure employed in the chlorinator containing the purest chlorine may vary from under 100 to 300 or more pounds per square inch, preferably about 270 lbs. The pressures in the other chlorinators will be dependent upon the initial pressure used, but if a higher pressure is desired booster pumps may be used. Low pressures may be used in the hydrogen chloride treating chambers.

The temperature may vary considerably, from atmospheric to 80° C. or slightly higher being suitable. In producing a very highly chlorinated product, 65° to 70° C. is preferable. If too high a temperature be employed, decomposition of the product may occur attended by darkening or charring.

The invention, as indicated in the foregoing, involves in its preferred aspects the exposure of dry solid sheet rubber, rubber sponge or sprayed latex, or comminuted particles of rubber to the action of mixtures of chlorine and hydrogen chloride under superatmospheric pressure. It is not, however, beyond the scope of the invention in certain of its modifications, to have incorporated with the rubber, a small amount of solvent, as for example, benzol or carbon tetrachloride to the extent of 10% to 20% of the weight of the rubber, and preferably, in any event, the amount of solvent not greater in weight than the weight of the rubber employed.

The use of liquid instead of gaseous chlorine is also not precluded, nor is the use of bromine, or of iodine, along with chlorine to form compounds containing these elements as well as carbon, hydrogen and chlorine.

The following is an illustration exemplifying one method by which this invention may be carried out but to the details of which it is not limited.

Cut 100 parts by weight of crêpe rubber into shreds and place in a lead-lined chamber constructed so as to withstand pressure. Connect the vessel to a cylinder of liquid chlorine and warm the latter to 40° to 50° C. for half an hour, keeping the chlorinator cooled, say from 10° to 15° C. Then close the valves between the cylinder and the chlorinator and heat the latter to 60° to 65° C. by means of a water jacket. A pressure of 260 to 290 lbs. per sq. inch will develop, which may increase somewhat. Maintain these conditions for about eight hours, then discharge the gases into a second chlorinator, containing unreacted crude rubber, prepared as above, and recharge the first chlorinator with chlorine. Heat both to 60° to 65° C. At the end of eight to sixteen hours additional, repeat, passing the waste gases from the second to a third chlorinator which is heated likewise. When a further like period has elapsed, discharge the first chlorinator, and remove the chlorinated material. Refill with fresh rubber and pass the waste gas from number three into number one. Charge number two with chlorine, and heat to 60° to 65° C. Number two now takes the place of number one, number three of number two, and number one of number three. Continue the process similarly. Wash and grind the product removed from number one. When dry it is ready for use.

One phase of the invention may be expressed as the step which comprises exposing unchlorinated rubber under a pressure above atmospheric to spent or depleted chlorine gas containing hydrogen chloride.

What I claim is:—

1. The process of treating rubber which consists in exposing the rubber to the action of a mixture of chlorine and hydrogen chloride, under super-atmospheric pressure, in a series of vessels, the proportion of hydrogen chloride being at first high and progressively decreasing, and the proportion of chlorine correspondingly increasing, whereby the final treatment is made with chlorine initially supplied substantially pure.

2. In the process of making chlorinated rubber, the step which comprises exposing unchlorinated rubber, under pressure to spent chlorine gas containing hydrogen chloride.

CARLETON ELLIS.